United States Patent
Nagata et al.

(10) Patent No.: US 7,072,926 B2
(45) Date of Patent: Jul. 4, 2006

(54) BLIND TRANSPORT FORMAT DETECTION SYSTEM AND METHOD WITH LOGARITHM APPROXIMATION FOR RELIABILITY FIGURE

(75) Inventors: Toshio Nagata, San Diego, CA (US); Mitsuhiko Yagyu, Koganei (JP)

(73) Assignee: Texas Instruments Incorporated, Dallas, TX (US)

( * ) Notice: Subject to any disclaimer, the term of this patent is extended or adjusted under 35 U.S.C. 154(b) by 657 days.

(21) Appl. No.: 10/164,868

(22) Filed: Jun. 7, 2002

(65) Prior Publication Data

US 2003/0014456 A1 Jan. 16, 2003

Related U.S. Application Data

(60) Provisional application No. 60/296,937, filed on Jun. 8, 2001.

(51) Int. Cl.
*G06F 1/02* (2006.01)

(52) U.S. Cl. .................................................. 708/277
(58) Field of Classification Search ................ 708/277, 708/512, 517, 650, 651, 652
See application file for complete search history.

(56) References Cited

U.S. PATENT DOCUMENTS

| | | | | | |
|---|---|---|---|---|---|
| 4,555,768 | A | * | 11/1985 | Lewis et al. | 708/625 |
| 5,642,305 | A | * | 6/1997 | Pan et al. | 708/517 |
| 5,675,822 | A | * | 10/1997 | Kelley | 712/35 |
| 5,933,360 | A | * | 8/1999 | Larson | 708/512 |
| 6,678,710 | B1 | * | 1/2004 | Shankar et al. | 708/517 |

OTHER PUBLICATIONS

3rd Generation Partnership Project; Technical Specification Group Radio Access Network; Multiplexing and channel coding (FDD) (Release 1999).
A 1-Gb/s, Four-State, Sliding Block Viterbi Decoder, Peter J Black et al.; 1997 IEEE, vol. 32, No. 6, Jun. 1997.
Variable-Rate Data Transmission with Blind Rate Detection for Coherent DS-CDMA Mobile Radio; IEICE Trans. Commun., vol. ES1-B., No. 7, Jul. 1998, pp. 1365-1372.

* cited by examiner

*Primary Examiner*—Chuong D. Ngo
(74) *Attorney, Agent, or Firm*—Carlton H. Hoel; W. James Brady; Frederick J. Telecky, Jr.

(57) ABSTRACT

Blind transport format detection with sliding window traceback for evaluating decodings to candidate block lengths together with piecewise linear approximation of the reliability figure (logarithm of ratio of maximum survivor path metric minus minimum survivor path metric divided by 0 state path metric minus minimum survivor path metric) with a small lookup table plus simple logic.

3 Claims, 11 Drawing Sheets

Figure 2
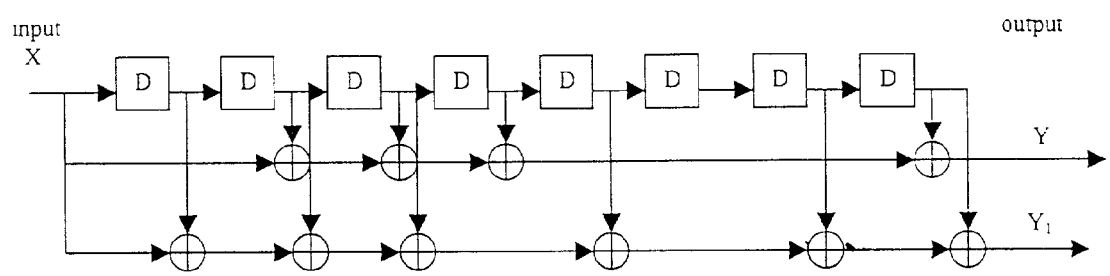
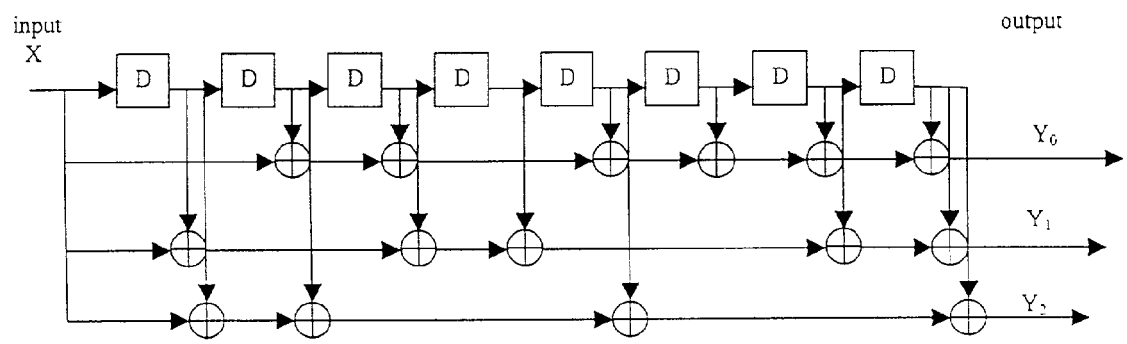

Figure 5  Basic processing flow of blind transport format detection state with maximum state metric at end of window window state 0 at end of block window

BLIND TRANSPORT FORMAT DETECTION SYSTEM AND METHOD WITH LOGARITHM APPROXIMATION FOR RELIABILITY FIGURE

CROSS-REFERENCE TO RELATED APPLICATIONS

This application claims priority from provisional applications: Ser. No. 60/296,937, filed Jun. 8, 2001.

BACKGROUND OF THE INVENTION

The invention relates to electronic communications, and more particularly to CDMA-based coding, transmission, and decoding/synthesis methods and circuitry.

Code division multiple access (CDMA) coding has been extensively used in such applications as cellular and satellite communications. CDMA signals increase the spectrum required for the transmission at a particular data rate by modulating each data symbol with a spreading code having a rate larger than the data rate. The same spreading code is used for each data symbol. Typically, the spreading code comprises of a few tens or a few hundreds of elements, called chips. To decrease the correlations among spreading codes assigned to different users, and thereby reduce the interference among different users, the data stream after spreading is typically scrambled with a pseudo-noise (PN) code that is generated serially and cyclically and has a larger period than the spreading code. Examples of such CDMA signal spreading are the schemes used by the IS-95/CDMA2000 and 3GPP systems.

The 3GPP system employs a 3.84 MHz bandwidth (a chip duration of 260 ns), and the spreading code length applied to each data symbol may vary from 4 chips to 256 chips. The number of chips per symbol is the spreading factor (SF), and SF stays constant during a 10 ms duration frame. However, the spreading factor may change from frame to frame. Each frame is partitioned into 15 time slots (0.667 ms duration) with each time slot consisting of 2560 chips, and thus the number of data symbols per slot ranges from 10 to 640 and per frame ranges from 150 to 9600.

3GPP allows for transport channels with differing data rates and formats as specified by the Transport Format Control Indicator (TFCI) field, but 3GPP also allows for omission of the TFCI with instead only a (previously-negotiated) set of possible (candidate) transport block lengths known by the decoder. In this situation a decoder may determine the transport block length by decoding for all possible candidate block lengths and selecting one of the decodings. In particular, FIGS. 4–5 illustrate a 3GPP blind transport format detection (BTFD) method which uses the CRC bits (attached at the end of a transport block prior to convolutional encoding) as follows. First the received stream of symbols are Viterbi decoded up to the end of the shortest of the candidate block lengths. Viterbi decoding includes state metric updatings with add-compare-select (ACS) computations for each received symbol plus recording in the trace-back buffer which detected transition (0/1 input to the convolutional encoder) was used for each state metric update; this uses a buffer for current state metrics plus a buffer for the streams of inferred 0/1 inputs (the trace-back buffer). Next, the state metric for state 0 at the end of this shortest block is checked for reliability, and if reliable, then the trellis path ending at this state 0 is traced back to the beginning. The traced-back path provides a decoding for the shortest block length which can be error checked with its presumed CRC bits. Second, the Viterbi decoding is continued from the end of the shortest block to the end of the second shortest block. Again, the state metric for the state 0 at the end of the second shortest block is checked for reliability, and if reliable, then the trellis path ending at this state 0 is traced back to the beginning. This traced-back path provides a decoding for the second shortest block length which can be error checked with its presumed CRC bits. Similarly for the remainder of the block lengths; and the best (if more than one) of the error-free decodings is selected. This method uses a logarithm function in the reliability check of the state metric for the state 0.

The known method has problems including large trace-back buffers and complex logarithm computation.

Black et al, A 1-Gb/s, Four-State, Sliding Block Viterbi Decoder, 32 IEEE J. Solid State Cir. 797 (1997) describes a Viterbi decoder using a sliding decoding block of length less than the entire block to decode.

SUMMARY OF THE INVENTION

The present invention provides a low complexity implementation for blind format detection with a sliding window Viterbi decoding.

The preferred embodiments provide more efficient blind transport format detection.

BRIEF DESCRIPTION OF THE DRAWINGS

The drawings are heuristic for clarity.

FIG. 2 illustrates encoders.

DETAILED DESCRIPTION OF THE PREFERRED EMBODIMENTS

1. Overview

Figure 1A:
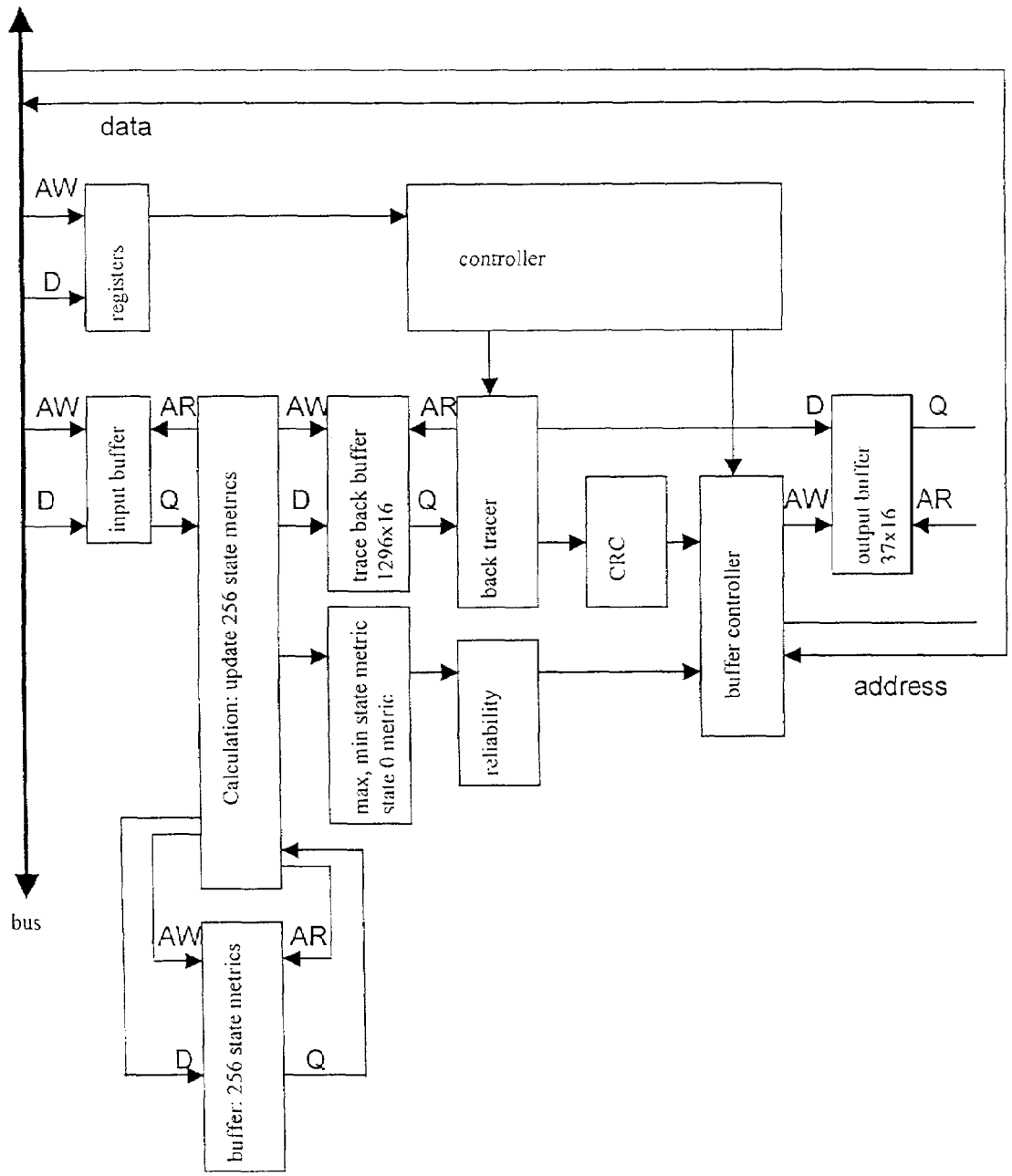
FIGS. 1a–1b are block diagrams of a preferred embodiment.
Figure 1B:
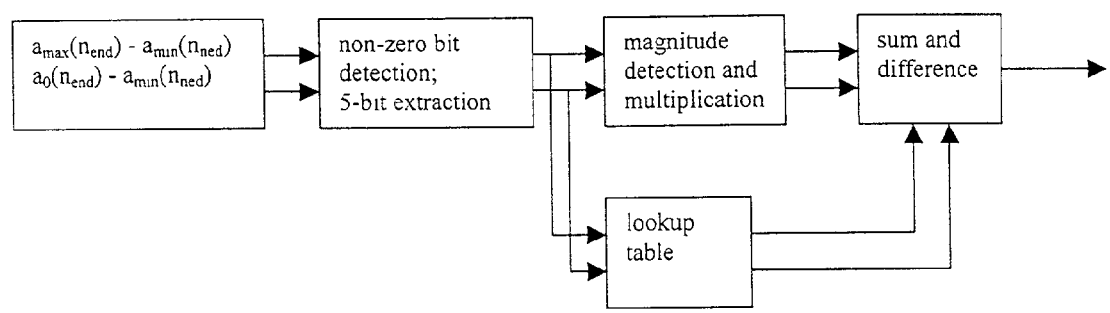

Some preferred embodiment methods implement blind transport format detection (BTFD) as in 3GPP with a piecewise linear approximation of a logarithm for the reliability measure and other preferred embodiment methods use a windowed decoding. FIG. 1a schematically shows a preferred embodiment windowing decoder with a reliability block which may include a preferred embodiment logarithm approximation as illustrated in FIG. 1b.

Preferred embodiment systems include cellular CDMA communication systems where several mobile users communicate with a base station, and the preferred embodiment BTFD methods and decoders are used.

The preferred embodiment methods may be implemented on programmable processors (such as DSP's) or in specialized circuits (ASIC's) or combinations such as system-on-a-chip with attendant analog-digital signal components. The methods could be stored programs in ROM with registers and on-board RAM for temporary data storage.

2. Blind Transport Format Detection

The first preferred embodiment blind transport format detection (BTFD) methods follow the methods of 3GPP BTFD using CRC but with a special approximation for the logarithm function; thus preliminarily consider 3GPP BTFD using CRC. 3GPP has two convolution coders with coding rates ½ and ⅓ with as illustrated in FIG. 2 for shift register implementations. Each time increment provides an input bit plus shifts the stored bits to generate the output bits (symbol); either $Y_0, Y_1$ for rate ½ or $Y_0, Y_1, Y_2$ for rate ⅓. The pattern of the eight stored bits (the outputs of the eight delay units) defines the state of the shift register, and these 256 possible states are numbered 0 to 255 simply by interpreting the bit pattern as a binary number with the LSB being the rightmost (and most recent) bit. Thus at each time interval, the MSB is lost, the 7 remaining bits are shifted (multiplication by 2 of the 7-bit number), and a new LSB input. That is, the states $0x_6x_5x_4x_3x_2x_1x_0$ and $1x_6x_5x_4x_3x_2x_1x_0$ both transition to state $x_6x_5x_4x_3x_2x_1x_0 0$ in the next time interval with an input 0 and both transition to state $x_6x_5x_4x_3x_2x_1x_0 1$ with an input 1. More succinctly, if the 7-bit number $x_6x_5x_4x_3x_2x_1x_0$ is denoted n, then states n and n+128 both yield state 2n with an input 0 and both yield state 2n+1 with an input 1. Graphically, the two start states, the two end states, and the four connecting transitions between them form a "butterfly"; see FIG. 3.

For encoding a block of bits, the initial state of a shift register of FIG. 2 is eight 0s (the state 0). And after encoding the block of bits, input a sequence of eight 0s (tail bits) to force the shift register into state 0 for termination.

All sequences of the possible 256 states and connecting transitions (0/1 inputs and corresponding $Y_0, Y_1, (Y_2)$ outputs) form the code trellis, and a particular sequence of states with connecting transitions forms a path through the trellis. Thus a sequence of information bits input to the encoder (shift register) forms a path through the trellis, and Viterbi decoding the received sequence of sets of soft symbols which correspond to modulation by $Y_0, Y_1$ for rate ½ or $Y_0, Y_1, Y_2$ for rate ⅓. Viterbi decoding estimates this path as the maximum likelihood path by computing a state metric for each of the 256 states and updating all of these state metrics upon each receipt of a symbol. More particularly, for the rate ⅓ encoder, let metric(i,n) be the state metric for state n at time i, then recalling states n and n+128 each have transitions to states 2n and 2n+1, and presuming an AWGN transmission channel:

metric(i+1,2n)=max{metric(i,n)+$Z_0[2Y_0(n,2n)-1]+Z_1[2Y_1(n,2n)-1]+Z_2[2Y_2(n,2n)-1]$, metric(i,n+128)+$Z_0[2Y_0(n+128,2n)-1]+Z_1[2Y_1(n+128,2n)-1]+Z_2[2Y_2(n+128,2n)-1]$} metric(i+1,2n+1)=max{metric(i,n)+$Z_0[2Y_0(n,2n+1)-1]+Z_1[2Y_1(n,2n+1)-1]+Z_2[2Y_2(n,2n+1)-1]$, metric(i,n+128)+$Z_0[2Y_0(n+128,2n+1)-1]+Z_1[2Y_1(n+128,2n+1)-1]+Z_2[2Y_2(n+128,2n+1)-1]$} where $Y_k(n,2n)$ for k=0,1,2 are the three encoder output bits for a 0 input bit transition from state n to state 2n, $Y_k(n+128,2n)$ are the three output bits of the encoder for a 0 input transition from state n+128 to state 2n, and so forth. Note that $[2Y_k-1]$ converts the 0,1 of $Y_k$ to −1, +1 of the modulation, and the $\{Z_0, Z_1, Z_2\}$ are the received detected (digitized) analog symbol corresponding to the transmitted output $\{Y_0, Y_1, Y_2\}$.

Figure 6:
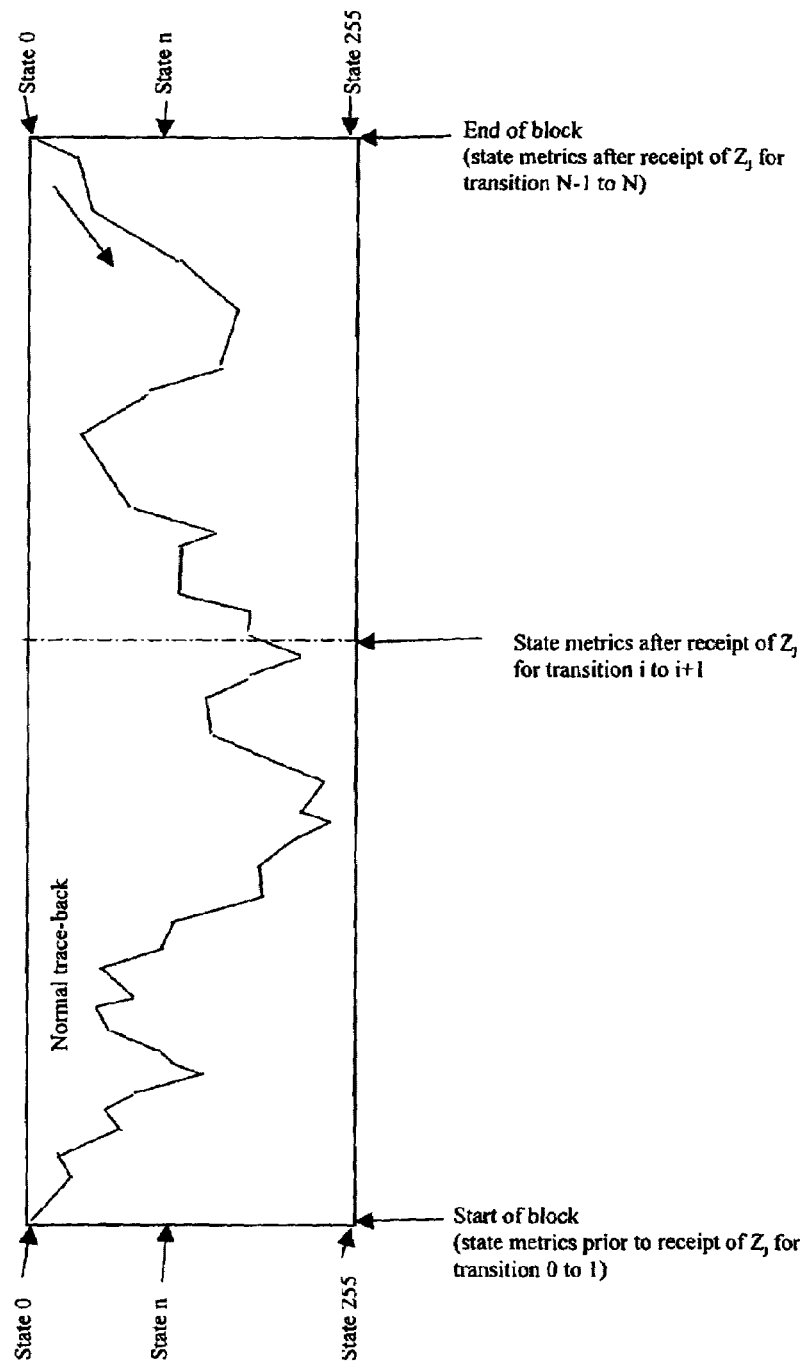
FIGS. 6–9b show trellis paths.

At each transition (time increment) for each state, store in a trace-back buffer one bit of information to indicate which of the two entering transitions (prior states) was selected by the max{}. In particular, at time i+1 for state 2n store a '0' when max{} came from the term metric(i,n)+$Z_0[2Y_0(n,2n)-1]+Z_1[2Y_1(n,2n)-1]+Z_2[2Y_2(n,2n)-1]$ which corresponds to an encoded bit 0, and store a '1' when the max came from the term metric(i,n+128)+$Z_0[2Y_0(n+128,2n)-1]+Z_1[2Y_1(n+128,2n)-1]+Z_2[2Y_2(n+128,2n)-1]$ which corresponds to an encoded bit 1. This requires 256*length N (N received $\{Z_0, Z_1, Z_2\}$). At the end of the sequence (path) a trace is carried out from the final state 0 (forced by the termination with tail bits) backwards through the trellis to the initial state 0 as illustrated in FIG. 6; this path (and the corresponding bits) is the Viterbi decoding. If all path selection information (a bit for each state at each transition) for a sequence of length 512 is stored in the trace-back buffer, then the necessary buffer size is about 128 kbits.

Figure 4:
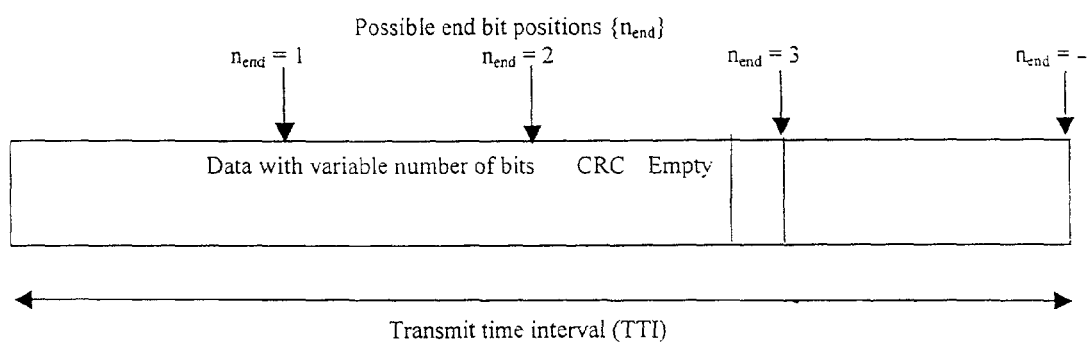
FIGS. 4–5 illustrate a blind transport format detection method.
Figure 5:
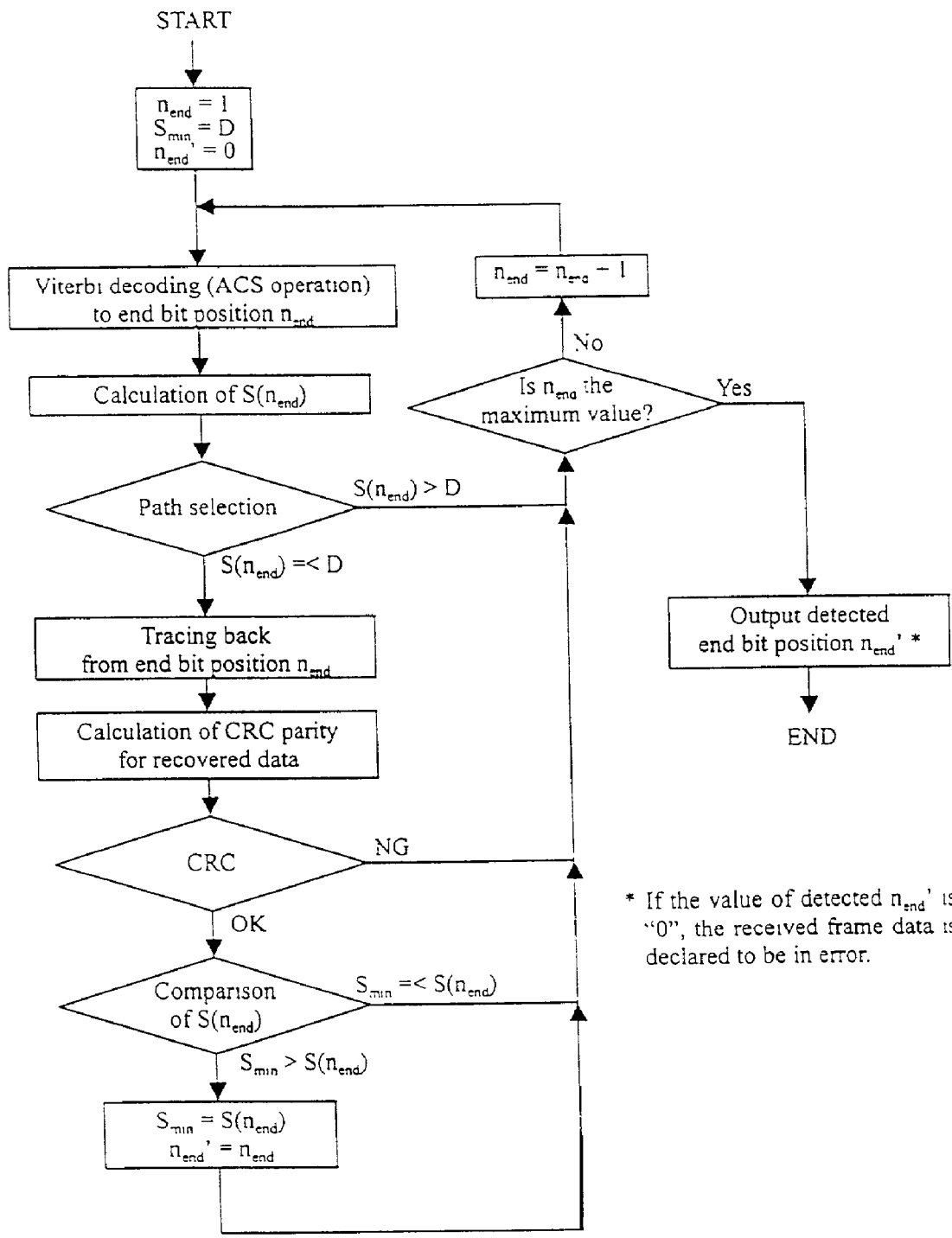

As an alternative to explicitly transmitting TFCI, 3GPP allows for transmission once of a set of possible (candidate) transport block lengths and relies on the receiver to use a blind transport format detection (BTFD) scheme to determine the actual block length. FIG. 4 illustrates four possible block lengths (possible ending bit numbers $n_{end}$) and a block ending at $n_{end}$=3. FIG. 5 shows the flow of the BTFD which uses trellis trace back for each possible (candidate) block length together with the last bits as CRC check bits to check for errors for this block length. In order to limit the probability of the CRC missing errors, the BTFD method uses the reliability figure $r(n_{end})$ in order to select a block length from candidate lengths.

$$r(n_{end}) = -10 \log_{10}([a_0(n_{end}) - a_{min}(n_{end})]/[a_{max}(n_{end}) - a_{min}(n_{end})])$$

where $a_{max}(n_{end})$ and $a_{min}(n_{end})$ are, respectively, the maximum and the minimum path-metric values among all 256 survivor paths at the $n_{end}$ ending of the block, and $a_0(n_{end})$ is the path-metric value of the 0 state at this block end. Note that by using the logarithm of the ratio, the reliability function is independent of the number of bits of accuracy of the state metrics. The method selects the correct, if any, block end $n_{ned}$ by using the following rule:

1) Initialize the minimum reliability figure, $r_{min}$, to an available maximum value D.
2) Conduct Viterbi decoding for one of the candidate block endings, $n_{end}$.
3) Calculate the reliability figure $r(n_{end})$ for this candidate length.
4) If $r(n_{end})$ is greater than threshold D, return to step 2) and next candidate.
5) Trace back from the 0 state at $n_{end}$.
6) Calculate CRC of the thus decoded bit sequence.
7) If CRC indicates error, return to step 2) for the next candidate.
8) If $r(n_{end}) \geq r_{min}$, return to 2) for the next candidate.
9) Retain the sequence, update $r_{min}$ to $r(n_{end})$, and return to step 2) for the next candidate.
10) If there is no sequence retained by step 9), declare an error.
11) Use the retained path from step 9) as the decoded sequence.

FIG. 5 is the flow diagram for this rule.

Because the reliability figure $r(n_{end})$ uses a logarithm, a look up table would be required to avoid introducing software or hardware to evaluate the logarithm function, and the lookup table would have size 8 kbits having 1 k entries (10-bit data) with each entry 8 bits. This size lookup table is a problem.

3. First Preferred Embodiment Blind Transport Format Detections

The first preferred embodiment blind transport format detection methods reduce the complexity of a large lookup table or software implementation for implementation of the logarithm function used in the reliability function $$r(n_{end}) = -10\log_{10}([a_0(n_{end}) - a_{\min}(n_{end})]/[a_{\max}(n_{end}) - a_{\min}(n_{end})])$$
$$= -10\log_{10}(a_0(n_{end}) - a_{\min}(n_{end})) + 10\log_{10}(a_{\max}(n_{end}) - a_{\min}(n_{end}))$$

by replacing the large lookup table with a 32-bit table plus a small amount of logic. Indeed, approximate each of the logarithms separately, noting that a constant added to both will cancel out. In particular, let $$c = a_{\max} - a_{\min}$$
$$d = a_0 - a_{\min}$$

so $r(n_{end}) = -10 \log_{10}(d/c) = 10 \log_{10}c - 10 \log_{10}d$. Suppose $a_{\max}$ and $a_{\min}$ are 10-bit numbers and let m be a 5-bit positive integer extracted from c such that the first non-zero bit of c corresponds to the MSB of m and the other 4 bits of m are the next 4 bits of c or 0s if the c bits run out. Similarly, extract the 5-bit integer n from d in the same bit locations as m. Hence, to 5 significant bits, $d/c = n/m$ and thus $$r(n_{end}) = 10 \log_{10}c - 10 \log_{10}d \approx 10 \log_{10}m - 10 \log_{10}n.$$

Note that the number of bits in $a_{\max}$, $a_{\min}$, and $a_0$ can be varied without affecting the 5-bit approximation; in particular, 16-bit $a_{\max}$, $a_{\min}$, and $a_0$ can use the same definitions. Also, note that by definition m has an MSB equal to 1 (so $31 \geq m \geq 16$) and $m \geq n \geq 0$. Also, if c=0 (so there is no non-zero bit), then $a_{\max} = a_{\min} = a_0$ and there is no reliability problem.

Further, changing the base for the logarithm function only introduces a constant multiple but can make the lookup table simple. In particular, express the reliability with logarithms to base b:

$$r(n_{end}) = 10\log_{10}m - 10\log_{10}n$$
$$= \log_{10}b[10\log_b m - 10\log_b n]$$

and the $\log_{10}b$ term can be absorbed into $r(n_{end})$ and D. Thus use a redefined reliability:

$$r'(n_{end}) = 10 \log_b m - 10 \log_b n$$

A first preferred embodiment method picks b so that $10 \log_b 2 = 16$; that is, take $b = 2^{1/1.6} \approx 1.54 \ldots$, and so $\log_{10}b = 0.1875 \ldots$. Then the preferred embodiment approximates the first term $10 \log_b m$ of the reliability $r'(n_{end})$ by the variable t as follows
if (m==0) t=−128; //this corresponds to $a_{\max} = a_{\min}$
else if (m<2) t=table[m];
else if (m<4) t=table[m]+8m;
else if (m<8) t=table[m]+4m+16;
else if (m<16) t=table[m]+2m+32;
else t=table[m]+m+48;

where the array table[] has 32 entries which are either 0 or 1 as:
table[32]={0,0,0,1,0,1,1,1,0,1,1,1,1,1,1,1,0,0,1,1,1,1,1,1,1,1,1,1,1,1,1,0}
Note that table[0] is not used (t=−128) and table[1]==0 just reflects log1=0.

Similarly, approximate the second term $10 \log_b n$ by the variable u as follows:

if (n==0) u=−128;
else if (n<2) u=table[n];
else if (n<4) u=table[n]+8n;
else if (n<8) u=table[n]+4n+16;
else if (n<16) u=table[n]+2n+32;
else u=table[n]+n+48;

Consequently, approximate the redefined reliability $r'(n_{end})$ by t−u.

For example, if $a_{\max}$=1011010011, $a_{\min}$=1001101001, and $a_0$=1010010010, then $a_{\max} - a_{\min} = c = 0001101010$ (=106), m=11010 (=26), $a_0 - a_{\min} = d = 0000101001$ (=41), and n=01010 (=10). Hence, t=table[26]+26+48=1+26+48=75 and u=table[10]+2*10+32=1+20+32=53. Thus t−u=75−53=22; so the approximated redefined reliability $r'(n_{end})$=22. For comparison, the exact result would be $$r(n_{end}) = 10\log_{10}c - 10\log_{10}d$$
$$= 10\log_{10}106 - 10\log_{10}41$$
$$= 20.253 - 16.128$$
$$= 4.125$$

and this agrees with the preferred embodiment approximation:

$$r(n_{end}) = \log_{10}b \; r'(n_{end})$$
$$= 0.1875 \; r'(n_{end})$$
$$= (0.1875)(22)$$
$$= 4.125.$$

The foregoing approximation is a piecewise linear approximation to the logarithm with the table as a correction term for the convexity of the logarithm. And FIG. 1a illustrates (max, min . . . block and reliability block) the computations as first finding $a_{\max}$, $a_{\min}$, and $a_0$; next, computing c and d (a subtraction circuit or programmed processor); next, finding m and n (a bit detection and extraction circuit or programmed processor); and then computing $r'(n_{end})$ using multiplication, addition, and subtraction together with the lookup table. FIG. 1b shows the approximation functional blocks.

4. Second Preferred Embodiments

Second preferred embodiment methods are analogous to the first preferred embodiment methods but use other than 5-bit approximations in the logarithm. For example, with 4-bit approximation (so the lookup table has 16 bits), the integers m and n are 4 bits and the MSB of m is again the first nonzero bit of c, and n is the 4 bits at the same locations in d. In this case the logarithm approximation would approximate 10 log m by the variable t as follows:
if (m==0) t=−128;
else if (m<2) t=table[m];
else if (m<4) t=table[m]+8m;
else if (m<8) t=table[m]+4 m+16;
else t=table[m]+2 m+32;

where the array table[] has 16 entries which are just the first half of the first preferred embodiment table: table[16]={0,0,0,1,0,1,1,1,0,1,1,1,1,1,1,1}
For the same example as in the first preferred embodiment, c (=106) and d (=41) remain the same, but the 4-bit m=13 and 4-bit n=5. Thus t=table[13]+2*13+32=59, u=table[5]+4*5+16=37, and t−u=22, the same as with the first preferred embodiment; so the approximation is the same.

Further, the 4-bit preferred embodiment could also simplify the lookup table by changing the base for the logarithm from b=1.54 . . . to b=(1.54 . . . )$^2$ which will make 10 log$_b$2=8 and change the approximation to:

if (m==0) t=−128;
else if (m<2) t=table[m];
else if (m<4) t=table[m]+4m;
else if (m<8) t=table[m]+2 m+8;
else t=table[m]+m+16;

and similarly for u in terms of n. Because this essentially just divided the prior by 2, the lookup table changes to table[16] ={0,0,0,1,0,1,1,0,0,0,0,1,1,1,0,0}

With this new b, the redefined reliability function r″(n$_{end}$) =t−u leads to:

$$r(n_{end}) = \log_{10} b \, r''(n_{end})$$
$$= 0.375 \, r''(n_{end})$$

And again using the same example, c (=106), d (=41), 4-bit m=13, and 4-bit n=5 all remain the same, but t=table[13]+ 13+16=30, u=table[5]+2*5+8=19, and t−u=11; so r(n$_{end}$) =0.375 r″(n$_{end}$)=(0.375)(11)=4.125, the same as before. In short, the approximation and table can be adjusted to the number of bits of resolution desired.

Analogously, the number of bits in m and n can be greater than 5; this still allows simple logic with an expansion of the lookup table and changes in the base for the logarithm. For example, positive m and n with M bits (in the range 0 to $2^M-1$) and the logarithm base such that 10 log$_b$2=$2^{M-1}$, if n is in the range $2^j$ to $2^{j+1}$ for a positive integer j, take u=n$2^{M-1-j}$+(j−1)$2^{M-1}$+table[n] the approximation of 10 log$_b$n where table[ ] is a table of size $2^M$ (although the special cases of table[0] is irrelevant because u is taken as large negative and table[1]=0 due to log$_b$1=0 for every base b). Of course, for greater resolution the lookup table could be expanded to 2-bit or larger entries.

5. Trace-Back Windowing Preferred Embodiments

Figure 7:
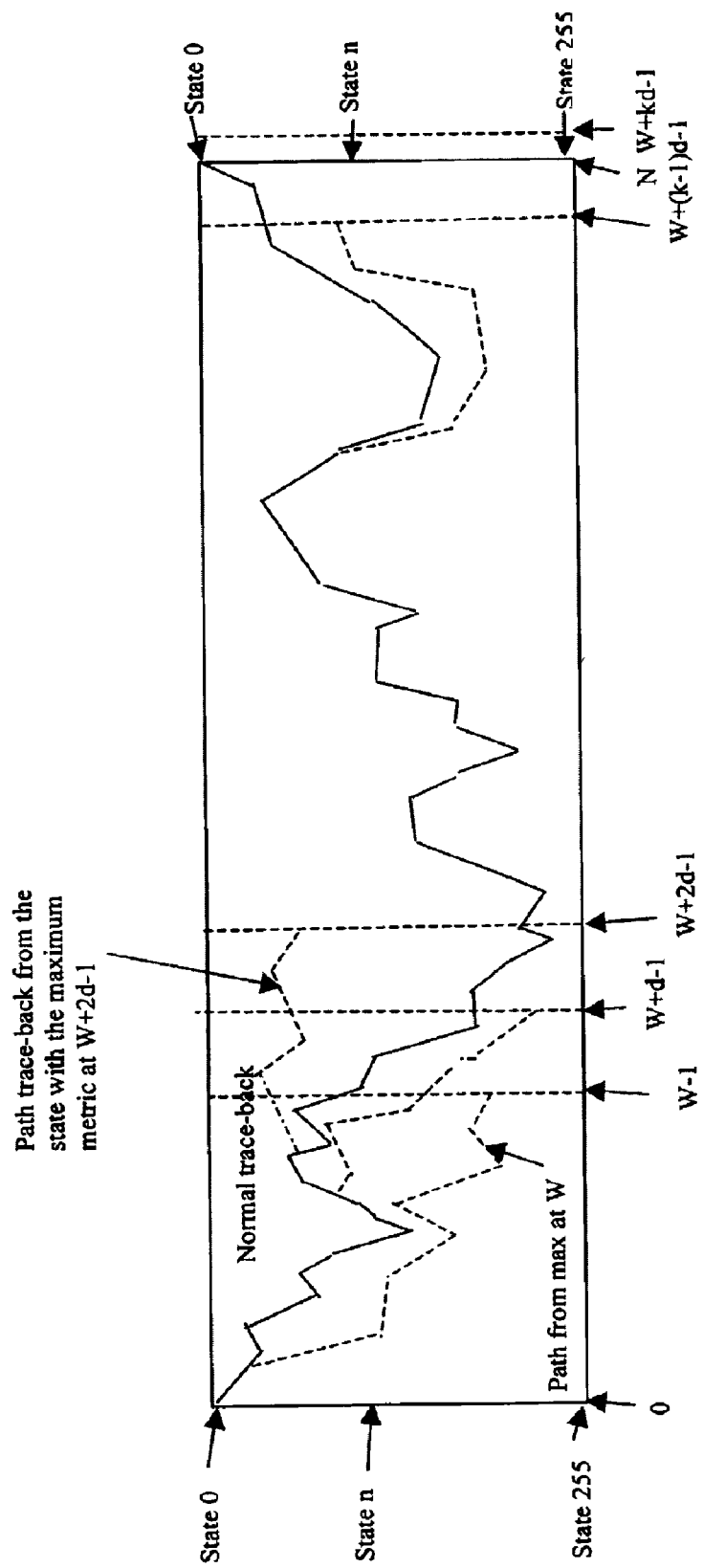

The trace-back windowing preferred embodiments reduce the complexity of foregoing preferred embodiment BTFD methods which use a Viterbi decoding for each of the candidate block sizes to select the correction one. In particular, the trace-back windowing preferred embodiments use sliding windows for the trace backs; this reduces the trace-back buffer size. Indeed, consider a sliding window of size W. If W is sufficiently large, then a path traced back from the state on the end edge of the sliding window with the largest state metric will converge to the path obtained by the normal trace back from state 0 at the block end. FIG. 7 illustrates this with trace-back paths from window end edges at W−1, W+d−1, and W+2d−1 plus the normal trace-back path.

The preferred embodiment sliding window decoding method with window length W and window slides of length d is:

1) Start state metric calculation from state 0 at time 0; this is the usual.
2) Continue state metric calculations up to the first window end edge at time W−1.
3) Carry out trace-back from the state with the largest state metric at time W−1 back to time 0.
4) Retain the last d bits (corresponding to times 0, 1, . . . , d−1) out of the W decoded bits of step 3) and discard the remaining W−d bits.
5) Continue the state metric calculations up to the next window end edge at time W+d−1.
6) Carry out trace-back from the state with the largest state metric at time W+d−1 back to time d (i.e., the front edge of this next window).
7) Retain the last d bits (corresponding to times d, d+1, . . . , 2d−1) out of the W decoded bits from step 6) and store them with the prior d bits from step 4); discard the remaining W−d bits.
8) Repeat steps 5)–7) until the state metric calculations reach the end of the input block.
9) Carry out trace-back from the state 0 at the block end back to the front edge of the last window (which included the block end).
10) Retain all decoded bits from step 9) and store together with prior retained and stored bits from step 4) and all repeats of step 7).

FIG. 7 illustrates the windows and trace-backs with k denoting the number of window slides to cover the entire block.

Figure 8:
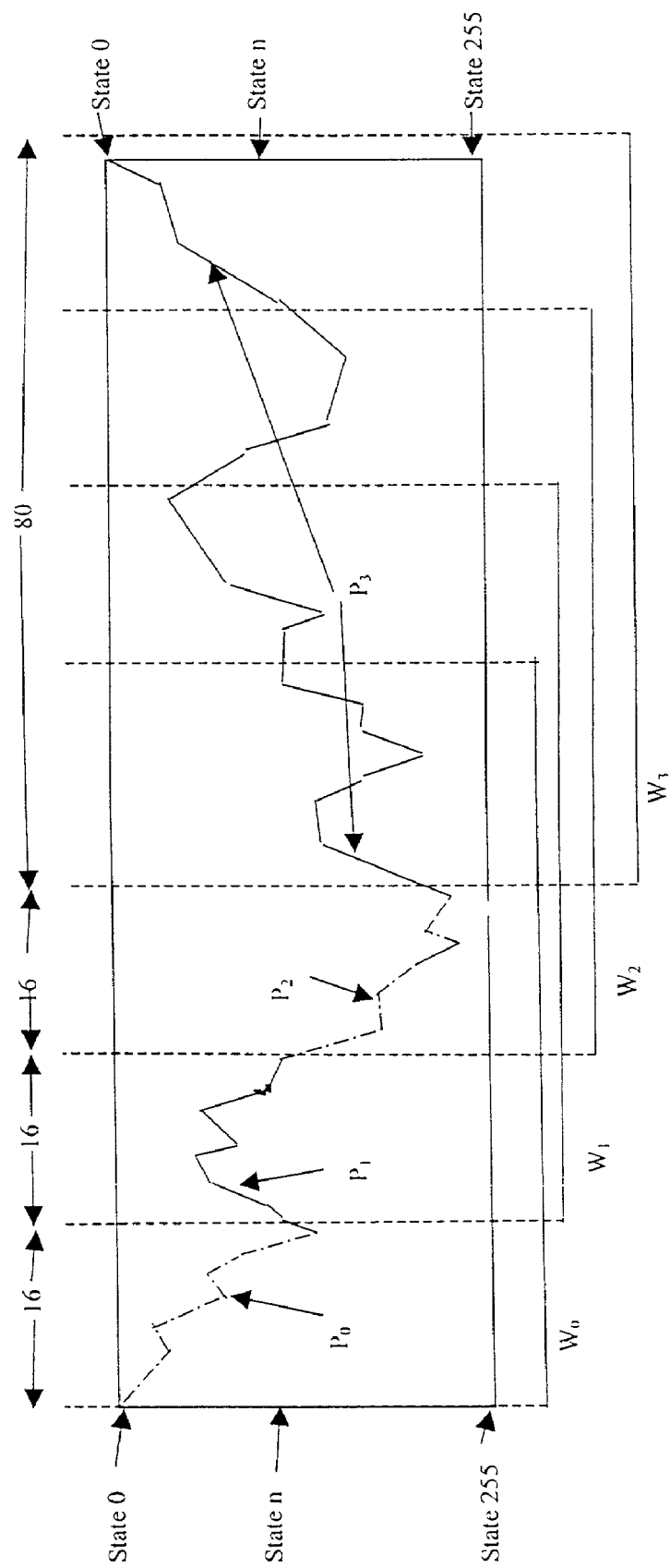

The decoding quality (i.e., comparable to normal trace-back) of the preferred embodiment sliding window method depends upon the window size W and the sliding distance d (or window overlap size W−d). For example, FIG. 8 shows the case of a block of size 120, a window of size 80, and a slide distance of 16 (overlap size 64); so four windows cover the block. In general, a trace-back of length at least the survivor path length L=5 log$_2$M, where M is the number of states, converges to the correct path with very high probability. Thus a trace back of at least 40 time intervals (received symbols) should suffice.

16 bits are obtained in each of first three trace-backs of 80-bit window sequences and are illustrated as length 16 paths $P_0$, $P_1$, and $P_2$ in FIG. 8. The final 72-bit trace back $P_3$ starts from state 0 at the block end and traces back to the front of window $W_3$. The concatenation of paths $P_0$, $P_1$, $P_2$, and $P_3$ provides the whole decoded sequence.

In the sliding window method, once a trace-back is completed for a window of size W, the d decoded (retained) bits will not be influenced by the subsequent decoding process. Decoding of these d bits is complete and fixed. Therefore, the decoded bits for different code lengths vary only within the decoded bits from the last window whose trace back starts at state 0 of the end of the block. In the example of FIG. 8, paths $P_0$, $P_1$, and $P_2$ are common to all decoded bits with block length 120 plus blocks larger than 120. But $P_3$ is valid only for block length of 120. Presuming the block length 120 example of FIG. 8 is one of 16 candidate block lengths (denoted $C_1$, $C_1$, . . . , $C_{15}$) and that 16 bits can be retrieved by a single trace back window, then further windows would be used.

To decode the input sequence repeatedly, each decoding with one of the 16 different block lengths, then the computational complexity is equivalent to decoding a single sequence of block length $\Sigma_{0 \leq j \leq 15} C_j$. However, with the sliding window method, decoding complexity can be reduced to $C_{15}$ (the largest block size) where it is presumed that the state metric calculations and trace back can be done in parallel so that no additional clock cycles are required to conduct the trace back. Note that state metric calculation needs to be done only once for each transition input. Only the initial trace back point varies: either state 0 or the maximum state metric state corresponding to either trace back from block end or from the final edge of the window; as in FIG. 7.

Figure 3:
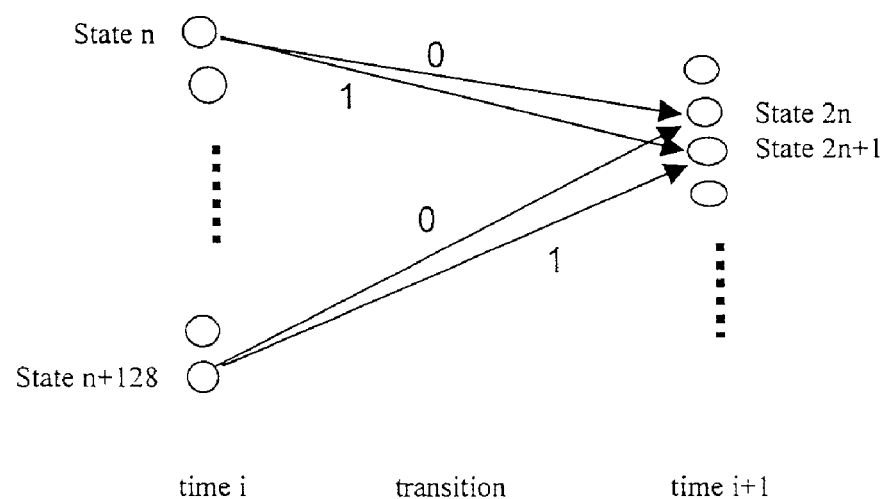
FIG. 3 shows a trellis butterfly.

FIG. 1a shows an example of hardware implementation of the BTFD. For each input data, 256 state metrics need to be updated and have to be stored in a RAM with 256 entries. As shown by the butterfly of FIG. 3, two previous state metrics are necessary to update one state metric. It is obvious that two consecutive state metrics can be updated from the same two previous state metrics. As a state metric buffer, one 256-entry RAM is employed. One read and one write of previous and new state metric values must be done in a single clock cycle. The minimum and the maximum state metrics among the 256 state metrics are calculated and stored to registers. The minimum value obtained from the previous 256 state metrics stored in the register is subtracted from state metrics read from the RAM. Thus metrics at time $i+1$ can be expressed as metric($i+1,2n$)=max{metric($i,n$)−$a_{min}(i)$+$Z_0[2Y_0(n,2n)−1]$+$Z_1[2Y_1(n,2n)−1]$+$Z_2[2Y_2(n,2n)−1]$, metric($i,n+128$)−$a_{min}(i)$+$Z_0[2Y_0(n+128,2n)−1]$+$Z_1[2Y_1(n+128,2n)−1]$+$Z_2[2Y_2(n+128,2n)−1]$} metric($i+1,2n+1$)=max{metric($i,n$)−$a_{min}(i)$+$Z_0[2Y_0(n,2n+1)−1]$+$Z_1[2Y_1(n,2n+1)−1]$+$Z_2[2Y_2(n,2n+1)−1]$, metric($i,n+128$)−$a_{min}(i)$+$Z_0[2Y_0(n+128,2n+1)−1]$+$Z_1[2Y_1(n+128,2n+1)−1]$+$Z_2[2Y_2(n+128,2n+1)−1]$} where $a_{min}(i)$ is the minimum metric at time i. This subtraction is beneficial to prevent overflow and to simplify the reliability calculation for $r(n_{end})$.

The information of path selection for one input data (one transition) requires 256 bits. The sliding window size and the window overlap size are assumed to be 80 and 64, respectively. 16 decoded bits are obtained from a 80-bit traced-back sequence. The required size of the trace back buffer is 80×256 bits. With an additional 256-bit storage to realize a ring buffer, the size becomes 81×256 bits=1296×16 bits, so use a 1296×16 bit RAM for the trace back buffer (see FIG. 1a). These additional 256 bits are necessary to provide enough hardware clock margins to complete tracing back concurrently. In the worst case, two trace backs will be required from state 0 or the maximum state metric state at the edge of the window. About 80×2=160 clock cycles are consumed for the worst case tracing back. The number is below the available clock cycles of 256.

Figure 9A:
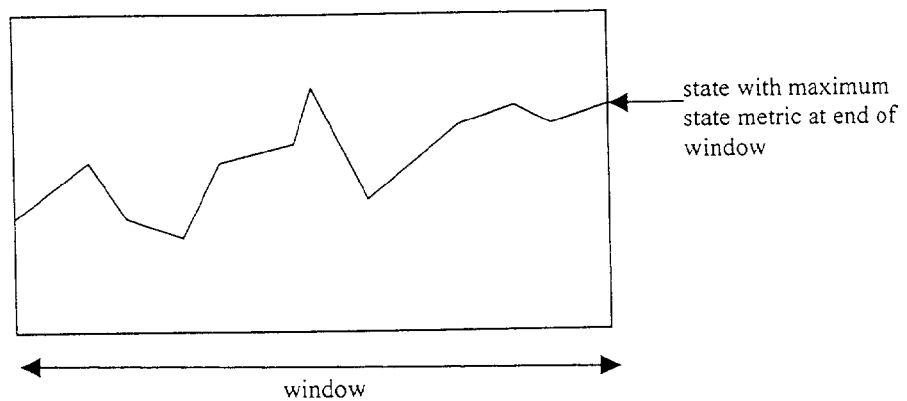
Figure 9B:
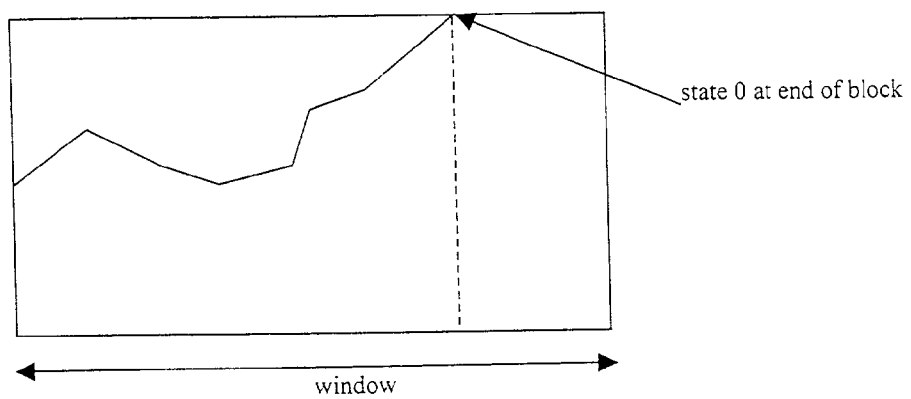

After state metric calculation for the first 80 received symbols, the trace back buffer is filled up and ready for tracing back. After this first trace back, the trace back buffer becomes ready at the completion of every 16 transitions (256×16 state metric calculations). There are two types of trace back operations: (1) when the data comes to the edge of the sliding window (see FIG. 9a) and (2) when the transition reaches to one of the block size candidate (see FIG. 9b). For the first case, the trace back starts from the maximum state metric while, for the second case, the trace back starts from state 0. Note that 16 decoded bits for the first case is common to all block length candidates. Thus the difference in decoded bit sequence is always bounded within the decode sequence in the second case. From this reason decoded bits for the first case and the second case are stored in the output RAM separately. Also, the results of CRC calculations for the first case can be stored and not necessarily be recalculated for each block length candidate.

If there are several decoded sequences whose CRC checks indicate no error, then a sequence with the smallest reliability figure is selected. If all sequences cannot pass the CRC check, then reliability figures of all sequences are compared and a sequence with the smallest reliability figure is selected.

Figure 10:
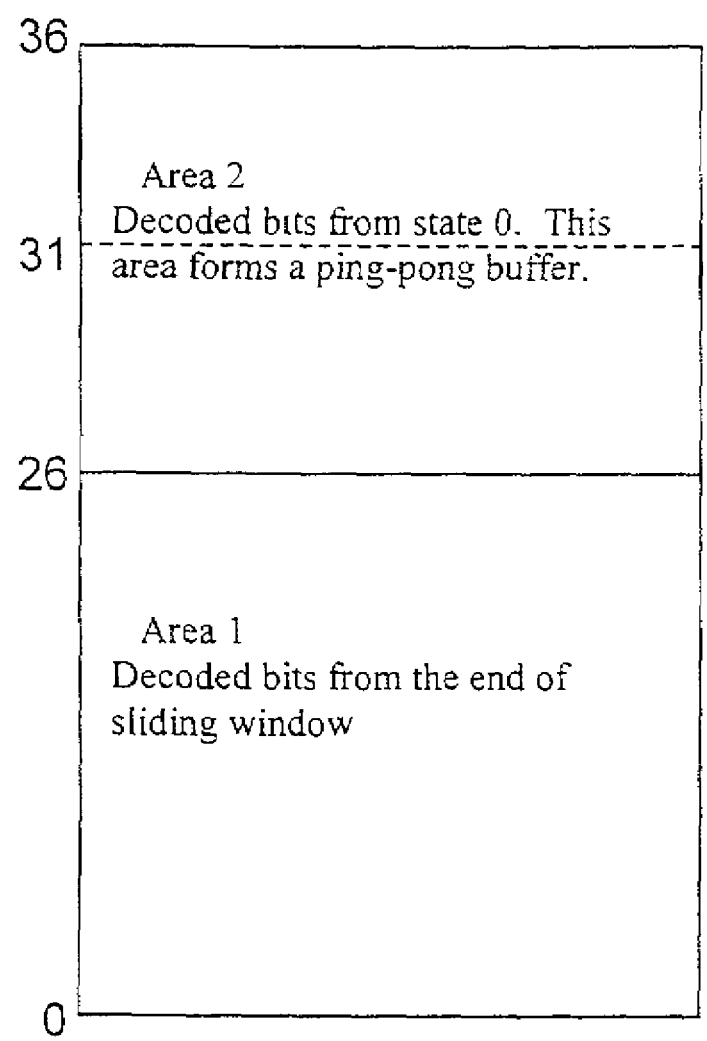
FIG. 10 is a memory map.

FIG. 10 shows the memory map of the output buffer. The decoded bits for the first case are stored between 0 and 27 (area 1). The rest of the RAM forms a ping-pong buffer (area 2) so that the most likely (in terms of CRC match and smaller reliability figure) decoded bit sequence can be retained in one of the ping-pong buffers. The other buffer is used to continue decoding, evaluation of CRC and reliability figure for the rest of block length candidates. Once the block size is resolved, how to concatenate decoded sequence from buffer area 1 and area 2 is straightforward.

What is claimed is:

1. A method of reliability figure computation for blind transport format detection, comprising:
    (a) providing N-bit numbers c and d where N a positive integer and d is less than or equal to c and where $c=a_{max}-a_{min}$ and $d=a_0-a_{min}$ with $a_{max}$ and $a_{min}$ are the maximum and minimum path metric values, respectively, among survivor paths at a possible block end, and $a_0$ is the path metric value of the 0 state at said possible block end;
    (b) extracting M-bit number m from said c where M is a positive integer less than N, said m aligned to the most significant non-zero bit of c;
    (c) extracting M-bit number n from said d, said n aligned to said m;
    (d) piecewise linearly approximating a logarithm of said m;
    (e) adjusting the approximation of step (d) by a table entry;
    (f) piecewise linearly approximating a logarithm of said n;
    (g) adjusting the approximation of step (f) by a table entry; and
    (h) approximating a logarithm of the quotient d/c by the difference of results of step (g) and step (e) whereby a reliability figure is approximated.

2. The method of claim 1, wherein:
    (a) M equals 5; and
    (b) said logarithm has base such that $10 \log_{base} 2 = 16$.

3. A method of reliability figure computation for blind transport format detection, comprising:
    (a) providing N-bit positive integer $c = x_1 x_2 \ldots x_N$ with N a positive integer and $x_1$ the most significant bit and $x_N$ the least significant bit and where $c = a_{max} - a_{min}$ and $d = a_0 - a_{min}$ with $a_{max}$ and $a_{min}$ are the maximum and minimum path metric values, respectively, among survivor paths at a possible block end, and $a_0$ is the path metric value of the 0 state at said possible block end;
    (b) providing N-bit positive integer $d = y_1 y_2 \ldots y_N$ with $y_1$ the most significant bit and $y_N$ the least significant bit and with d less than or equal to c;
    (c) extracting M-bit number m from said c, said m with most significant bit aligned to $x_j$ of said c where $x_1, x_2, \ldots, x_{k-1}$ are all 0 and $x_k$ is 1 where k is a positive integer with $1 \leq k \leq N$;
    (d) extracting M-bit number n from said d, said n with most significant bit aligned to $y_k$ with said k from step (c);
    (e) when said m is in the range $2^i$ to $2^{i+1}-1$ for a positive integer i, define a number $t = m 2^{M-1} + (M-i) 2^{M-1} + \text{table}[m]$ where table [ ] is a lookup table;
    (f) when said n is in the range $2^j$ to $2^{j+1}-1$ for a positive integer j, define a number $u = n 2^{M-1-j} + (j-1) 2^{M-1} + \text{table}[n]$; and
    (g) taking t−u as an approximation of log (d/c) whereby a reliability figure is approximated.

* * * * *